US010698859B2

(12) United States Patent
Burger et al.

(10) Patent No.: US 10,698,859 B2
(45) Date of Patent: Jun. 30, 2020

(54) DATA MULTICASTING WITH ROUTER REPLICATION AND TARGET INSTRUCTION IDENTIFICATION IN A DISTRIBUTED MULTI-CORE PROCESSING ARCHITECTURE

(75) Inventors: Doug Burger, Austin, TX (US); Stephen W. Keckler, Austin, TX (US); Dong Li, Austin, TX (US)

(73) Assignee: The Board of Regents of the University of Texas System, Austin, TX (US)

(*) Notice: Subject to any disclaimer, the term of this patent is extended or adjusted under 35 U.S.C. 154(b) by 1006 days.

(21) Appl. No.: 12/562,940

(22) Filed: Sep. 18, 2009

(65) Prior Publication Data

US 2011/0072239 A1 Mar. 24, 2011

(51) Int. Cl.

*G06F 15/173* (2006.01)
*G06F 13/14* (2006.01)

(Continued)

(52) U.S. Cl.

CPC ...... *G06F 15/17312* (2013.01); *G06F 9/3824* (2013.01); *G06F 9/3885* (2013.01);

(Continued)

(58) Field of Classification Search

CPC ............... G06F 13/14; G06F 15/17312; G06F 15/17318; H04L 12/18; H04L 45/00; H04L 45/16

(Continued)

(56) References Cited

U.S. PATENT DOCUMENTS 4,873,626 A * 10/1989 Gifford ............... G06F 9/30072 710/120
4,985,832 A * 1/1991 Grondalski ..................... 712/22

(Continued)

FOREIGN PATENT DOCUMENTS

JP 10-336175 A 12/1998
JP 2001175473 A 6/2001

(Continued)

OTHER PUBLICATIONS

Wikipedia, "Network on Chip", Sep. 15, 2009, 4 pages, retrieved from http://en.wikipedia.org/wiki/Network_On_Chip.*

(Continued)

*Primary Examiner* — David J. Huisman

(74) *Attorney, Agent, or Firm* — Klarquist Sparkman, LLP

(57) ABSTRACT

Methods, procedures, apparatuses, computer programs, computer-accessible mediums, processing arrangements and systems generally related to data multi-casting in a distributed processor architecture are described. Various implementations may include identifying a plurality of target instructions that are configured to receive a first message from a source; providing target routing instructions to the first message for each of the target instructions including selected information commonly shared by the target instructions; and, when two of the identified target instructions are located in different directions from one another relative to a router, replicating the first message and routing the replicated messages to each of the identified target instructions in the different directions. The providing target routing instructions may further comprise the selected information utilizing a subset of bits that is commonly shared by the target instructions and being identified as a left operand, right operand or predicate operand, and may include the selection (Continued)

P = PROCESSING CORE
R = ROUTER of one of a plurality of multiple-instruction subsets of the target instructions.

5 Claims, 6 Drawing Sheets

(51) Int. Cl.
*G06F 9/38* (2018.01)
*H04L 12/701* (2013.01)

(52) U.S. Cl.
CPC ........ *G06F 13/14* (2013.01); *G06F 15/17318* (2013.01); *H04L 45/00* (2013.01)

(58) Field of Classification Search
USPC ................ 370/390, 400, 432; 709/201, 238; 712/10
See application file for complete search history.

(56) References Cited

U.S. PATENT DOCUMENTS 5,317,734 A 5/1994 Gupta
5,333,320 A * 7/1994 Seki .............................. 713/100
5,615,350 A 3/1997 Hesson
5,669,001 A 9/1997 Moreno
5,729,228 A 3/1998 Franaszek et al.
5,790,822 A 8/1998 Sheaffer et al.
5,796,997 A 8/1998 Lesartre et al.
5,826,049 A * 10/1998 Ogata et al. .................. 710/317
5,845,103 A 12/1998 Sodani et al.
5,905,893 A 5/1999 Worrell
5,917,505 A 6/1999 Larson
5,930,491 A 7/1999 Hilgendorf et al.
5,943,501 A 8/1999 Burger et al.
6,016,399 A 1/2000 Chang
6,061,776 A 5/2000 Burger et al.
6,112,019 A 8/2000 Chamdani et al.
6,161,170 A 12/2000 Burger et al.
6,164,841 A 12/2000 Mattson et al.
6,178,498 B1 1/2001 Sharangpani et al.
6,240,510 B1 5/2001 Yeh et al.
6,282,708 B1 8/2001 Augusteijn et al.
6,295,599 B1 9/2001 Hansen et al.
6,295,616 B1 * 9/2001 O'Connell .............. H04L 43/50 714/715
6,314,493 B1 11/2001 Luick
6,353,883 B1 3/2002 Grochowski et al.
6,493,820 B2 12/2002 Akkary et al.
6,529,922 B1 3/2003 Hoge
6,615,340 B1 * 9/2003 Wilmot, II .................... 712/209
6,625,773 B1 * 9/2003 Boivie et al. ................. 714/749
6,662,294 B1 12/2003 Kahle et al.
6,820,192 B2 11/2004 Cho et al.
6,891,828 B2 * 5/2005 Ngai ............................. 370/357
6,892,292 B2 5/2005 Henkel et al.
6,918,032 B1 7/2005 Abdallah et al.
6,965,969 B2 11/2005 Burger et al.
6,980,209 B1 * 12/2005 Donham et al. .............. 345/426
6,988,183 B1 1/2006 Wong
7,032,217 B2 4/2006 Wu
7,085,913 B2 * 8/2006 Harding et al. ................ 712/15
7,085,919 B2 8/2006 Grochowski et al.
7,095,343 B2 8/2006 Xie et al.
7,299,458 B2 11/2007 Hammes
7,302,543 B2 11/2007 Lekatsas et al.
7,320,037 B1 1/2008 Maturi
7,380,038 B2 5/2008 Gray
7,487,340 B2 2/2009 Luick
7,599,998 B2 * 10/2009 Galbraith et al. ............ 709/213
7,624,386 B2 11/2009 Robison
7,676,650 B2 3/2010 Ukai
7,676,669 B2 3/2010 Ohwada
7,836,289 B2 11/2010 Tani
7,853,777 B2 12/2010 Jones et al.
7,877,580 B2 1/2011 Eickemeyer et al.
7,917,733 B2 3/2011 Kazuma
7,970,965 B2 6/2011 Kedem et al.
8,055,881 B2 11/2011 Burger et al.
8,055,885 B2 11/2011 Nakashima
8,127,119 B2 2/2012 Burger et al.
8,180,997 B2 5/2012 Burger et al.
8,201,024 B2 6/2012 Burger et al.
8,250,555 B1 8/2012 Lee et al.
8,312,452 B2 11/2012 Neiger et al.
8,321,850 B2 11/2012 Bruening et al.
8,433,885 B2 4/2013 Burger et al.
8,447,911 B2 5/2013 Burger et al.
8,464,002 B2 6/2013 Burger et al.
8,583,895 B2 11/2013 Jacobs et al.
8,812,821 B2 8/2014 Hansen et al.
8,817,793 B2 8/2014 Mushano
9,021,241 B2 4/2015 Burger et al.
9,043,769 B2 5/2015 Vorbach
9,053,292 B2 6/2015 Abdallah
2001/0032308 A1 10/2001 Grochowski et al.
2002/0016907 A1 2/2002 Grochowski et al.
2002/0121555 A1 9/2002 Cipolla et al.
2002/0126661 A1 9/2002 Ngai
2002/0126671 A1 9/2002 Ellis et al.
2003/0023959 A1 1/2003 Park
2003/0070062 A1 4/2003 Krishnan et al.
2003/0088694 A1 5/2003 Patek et al.
2003/0088759 A1 5/2003 Wilkerson
2004/0076155 A1 4/2004 Yajnik et al.
2004/0083468 A1 4/2004 Ogawa et al.
2004/0193849 A1 9/2004 Dundas
2004/0216095 A1 10/2004 Wu
2005/0005084 A1 1/2005 Burger et al.
2005/0172277 A1 8/2005 Chheda et al.
2005/0204348 A1 9/2005 Horning et al.
2006/0090063 A1 4/2006 Theis
2007/0165547 A1 7/2007 Lindwer et al.
2007/0226735 A1 9/2007 Nguyen et al.
2007/0239975 A1 10/2007 Wang
2007/0260854 A1 11/2007 Smith et al.
2007/0288733 A1 12/2007 Luick
2008/0109637 A1 5/2008 Martinez et al.
2009/0013135 A1 1/2009 Burger et al.
2009/0013160 A1 1/2009 Burger et al.
2009/0019263 A1 1/2009 Shen et al.
2009/0106541 A1 4/2009 Mizuno et al.
2009/0158017 A1 6/2009 Mutlu et al.
2009/0172371 A1 7/2009 Joao et al.
2009/0201928 A1 8/2009 Chen et al.
2010/0146209 A1 6/2010 Burger et al.
2010/0161948 A1 6/2010 Abdallah
2010/0191943 A1 7/2010 Bukris
2010/0325395 A1 12/2010 Burger et al.
2011/0010525 A1 * 1/2011 Binkert et al. .................. 712/29
2011/0035551 A1 2/2011 Hooker et al.
2011/0060889 A1 3/2011 Burger et al.
2011/0072239 A1 3/2011 Burger et al.
2011/0078424 A1 3/2011 Boehm et al.
2011/0202749 A1 8/2011 Jin et al.
2012/0158647 A1 6/2012 Yadappanavar et al.
2012/0246657 A1 9/2012 Abdallah
2012/0303933 A1 11/2012 Manet et al.
2012/0311306 A1 12/2012 Mushano
2013/0198499 A1 8/2013 Dice et al.
2014/0006714 A1 1/2014 Cherukuri et al.
2014/0181475 A1 6/2014 Abdallah
2014/0189239 A1 7/2014 Hum et al.
2014/0372736 A1 12/2014 Greenhalgh
2015/0006452 A1 1/2015 Kim et al.
2015/0026444 A1 1/2015 Anderson et al.
2015/0067662 A1 3/2015 Palalau
2015/0100757 A1 4/2015 Burger et al.
2015/0127928 A1 5/2015 Burger et al.
2015/0186293 A1 7/2015 Lin
2015/0199199 A1 7/2015 Burger et al.
2016/0203081 A1 7/2016 Kimura
2016/0306772 A1 10/2016 Burger et al.
2016/0378483 A1 12/2016 Burger et al.

(56) References Cited

U.S. PATENT DOCUMENTS

| | | | |
|---|---|---|---|
| 2017/0083318 | A1 | 3/2017 | Burger et al. |
| 2017/0083319 | A1 | 3/2017 | Burger et al. |
| 2017/0083320 | A1 | 3/2017 | Burger et al. |
| 2017/0083335 | A1 | 3/2017 | Burger et al. |
| 2017/0083341 | A1 | 3/2017 | Burger et al. |

FOREIGN PATENT DOCUMENTS

| | | | |
|---|---|---|---|
| JP | 2002149401 | A | 5/2002 |
| JP | 2013500539 | A | 7/2013 |
| WO | 03/017562 | A1 | 2/2003 |
| WO | WO 2006/127856 | | 11/2006 |
| WO | 2014193878 | A1 | 12/2014 |

OTHER PUBLICATIONS

Tutsch et al., "MLMIN: A Multicore Processor and Parallel Computer Network Topology for Multicast", Feb. 15, 2007, pp. 3807-3821.*

Burger et al., "Scaling to the End of Silicon with EDGE Architectures", In Proceedings of Computer, vol. 37, Issue 7, Jul. 1, 2004, pp. 44-55.*

Taylor, Michael B. et al., "Scalar Operand Networks: On-chip Interconnect for ILP in Partitioned Architectures", Proceedings, the Ninth International Symposium on High-Performance Computer Architecture, Feb. 2003, pp. 341-353.

Wang, Hangsheng et al., "Power-driven Design of Router Microarchitectures in On-chip Networks", Proceedings, 36th Annual IEEE/ACM International Symposium on Microarchitecture, Dec. 2003, pp. 105-116.

International Search Report and Written Opinion dated Apr. 9, 2012 for International Application No. PCT/US2010/038372, dated Apr. 9, 2012, 1-9.

Office Action Issued in United Kingdom Patent Application No. 1121576.1, dated Nov. 9, 2016, 8 Pages.

Office Action Issued in United Kingdom Patent Application No. 1121576.1, dated Apr. 19, 2016, 5 Pages.

Office Action Issued in United Kingdom Patent Application No. 1121576.1, dated May 27, 2016, 5 Pages.

Bouwens et al., "Architecture Enhancements for the ADRES Coarse-Grained Reconfigurable Array," High Performance Embedded Architectures and Compilers, Springer Berlin Heidelberg pp. 66-81 (2008).

Burger et al., "Design and Implementation of the TRIPS EDGE Architecture", In Proceedings of the 32nd Annual International Symposium on Computer Architecture, Jun. 4, 2005, pp. 1-41.

Coons et al., "A Spatial Path Scheduling Algorithm for EDGE Architectures," In Proceedings of the 12th International Conference on Architectural Support for Programming Languages and Operating Systems (ASPLOS), Oct. 12, 2006, 12 pages.

Desikan et al., "Scalable Selective Re-Execution for EDGE Architectures," In Proceedings of the 11th International Conference on Architectural Support for Programming Languages and Operating Systems, Oct. 9, 2004, 13 pages.

Gebhart et al., "An Evaluation of the TRIPS Computer System," In Proceedings of the 14th international conference on Architectural support for programming languages and operating systems, Mar. 7, 2009, 12 pages.

Gupta, "Design Decisions for Tiled Architecture Memory Systems," document marked Sep. 18, 2009, available at: http://cseweb.ucsd.edu/~a2gupta/uploads/2/2/7/3/22734540/researchexam.paper.pdf, 14 pages.

Hao et al., "Increasing the Instruction Fetch Rate via Block-Structured Instruction Set Architectures", In Proceedings of the 29th Annual IEEE/ACM International Symposium on Microarchitecture, Dec. 2, 1996, pp. 191-200.

Huang et al., "Compiler-Assisted Sub-Block Reuse," Retrieved on: Apr. 9, 2015; Available at: http://citeseerx.ist.psu.edu/viewdoc/download?doi=10.1.1.33.155&rep=rep1&type=pdf (also published as Huang & Lilja, "Compiler-Assisted Sub-Block Reuse," UMSI ResearchReport/University of Minnesota Supercomputer Institute 73 (2000)).

Huang, "Improving Processor Performance Through Compiler-Assisted Block Reuse," In Doctoral Dissertation, May, 2000, 125 pages.

Ipek et al., "Core Fusion: Accommodating Software Diversity in Chip Multiprocessors", In Proceedings of the 34th annual international symposium on Computer architecture, Jun. 9, 2007, 12 pages.

Kavi, et al., "Concurrency, Synchronization, Speculation—the Dataflow Way", In Journal of Advances in Computers, vol. 96, Nov. 23, 2013, pp. 1-41.

Keckler et al., "Tera-Op Reliable Intelligently Adaptive Processing System (Trips)," In AFRL-IF-WP-TR-2004-1514, document dated Apr. 2004, 29 Pages.

Kim et al., "Composable Lightweight Processors," 13 pages (document also published as Kim, et al., "Composable lightweight processors," 40th Annual IEEE/ACM International Symposium on Microarchitecture (MICRO 2007), pp. 381-394, (2007)).

Liu, "Hardware Techniques to Improve Cache Efficiency", In Dissertation of the University of Texas at Austin, May 2009, 189 pages.

Maher et al., "Merging Head and Tail Duplication for Convergent Hyperblock Formation," In Annual IEEE/ACM International Symposium on Microarchitecture, Dec. 2006, 12 pages.

McDonald et al., "Characterization of TCC on Chip-Multiprocessors," Parallel Architectures and Compilation Techniques, 2005. PACT 2005. 14th International Conference on. IEEE, 2005, 12 pages.

McDonald et al., "TRIPS Processor Reference Manual," In Technical Report TR-05-19, document marked Mar. 10, 2005, 194 pages.

Mei et al., "ADRES: An Architecture with Tightly Coupled VLIW Processor and Coarse-Grained Reconfiguration Matrix," 10 pages, (also published as Mei, et al. "ADRES: An architecture with tightly coupled VLIW processor and coarse-grained reconfigurable matrix," In Proceedings of 13th International Conference on Field-Programmable Logic and Applications, pp. 61-70 (Sep. 2003)).

Melvin et al., "Enhancing Instruction Scheduling with a Block-Structured ISA," International Journal of Parallel Programming, vol. 23, No. 3, Jun. 1995, 23 pages.

Munshi, et al., "A Parameterizable SIMD Stream Processor", In Proceedings of Canadian Conference on Electrical and Computer Engineering, May 1, 2005, pp. 806-811.

Nagarajan et al., "Critical Path Analysis of the TRIPS Architecture," in IEEE International Symposium on Performance Analysis of Systems and Software, Mar. 19, 2006, 11 pages.

Nagarajan et al., "A Design Space Evaluation of Grid Processor Architectures," In Proceedings of the 34th annual ACM/IEEE international symposium on Microarchitecture, Dec. 1, 2001, pp. 40-51.

Nagarajan et al., "Static Placement, Dynamic Issue (SPDI) Scheduling for EDGE Architectures," In Proceedings of the 13th International Conference on Parallel Architecture and Compilation Techniques, Sep. 29, 2004, 11 pages.

Pierce et al., "Wrong-Path Instruction Prefetching", In Proceedings of the 29th Annual IEEE/ACM International Symposium on Microarchitecture, Dec. 2, 1996, pp. 1-17.

Roesner, "Counting Dependence Predictors," In Undergraduate Honors Thesis, May 2, 2008, 25 pages.

Sankaralingam et al., "Distributed Microarchitectural Protocols in the TRIPS Prototype Processor," 12 pages (also published as "Distributed Microarchitectural Protocols in the TRIPS Prototype Processor," Proceedings of 39th Annual IEEE/ACM International Symposium on Microarchitecture, pp. 480-491 (2006)).

Sankaralingam et al., "Exploiting ILP, TLP, and DLP with Polymorphous TRIPS Architecture," In Proceedings of the 30th Annual International Symposium on Computer Architecture, Jun. 9, 2003, 12 pages.

Sankaralingam, "Polymorphous Architectures: A Unified Approach for Extracting Concurrency of Different Granularities", In Doctoral Dissertation of Philosophy, Aug. 2007, 276 pages.

(56) References Cited

OTHER PUBLICATIONS

Sankaralingam, et al., "TRIPS: A Polymorphous Architecture for Exploiting ILP, TLP, and DLP", In Journal of ACM Transactions on Architecture and Code Optimization, vol. 1, No. 1, Mar. 2004, pp. 62-93.

Sethumadhavan et al., "Design and Implementation of the TRIPS Primary Memory System," In Proceedings of International Conference on Computer Design, Oct. 1, 2006, 7 pages.

Smith et al., "Compiling for EDGE Architectures," In Proceedings of International Symposium on Code Generation and Optimization, Mar. 26, 2006, 11 pages.

Smith et al., "Dataflow Predication", In Proceedings of 39th Annual IEEE/ACM International Symposium on Microarchitecture, Dec. 9, 2006, 12 pages.

Smith, "Explicit Data Graph Compilation," In Thesis, Dec. 2009, 201 pages.

Smith, "TRIPS Application Binary Interface (ABI) Manual," Technical Report TR-05-22, Department of Computer Sciences, the University of Texas at Austin, Technical Report TR-05-22, document marked Oct. 10, 2006, 16 pages.

Souza et al., "Dynamically Scheduling VLIW Instructions", In Journal of Parallel and Distributed Computing, vol. 60, Jul. 2000, pp. 1480-1511.

Tamches et al., "Dynamic Kernel Code Optimization," In Workshop on Binary Translation, 2001, 10 pages.

Wu et al., "Block Based Fetch Engine for Superscalar Processors", In Proceedings of the 15th International Conference on Computer Applications in Industry and Engineering, Nov. 7, 2002, 4 pages.

Zmily, "Block-Aware Instruction Set Architecture", In Doctoral Dissertation, Jun. 2007, 176 pages.

Zmily et al., "Block-Aware Instruction Set Architecture", In Proceedings of ACM Transactions on Architecture and Code Optimization, vol. 3, Issue 3, Sep. 2006, pp. 327-357.

Zmily, et al., "Improving Instruction Delivery with a Block-Aware ISA", In Proceedings of 11th International Euro-Par Conference on Parallel Processing, Aug. 30, 2005, pp. 530-539.

Notice of Reexamination Issued in China Patent Application No. 201080035523.X, dated Jun. 15, 2016, 4 pages.

Office Action Issued in United Kingdom Patent Application No. 1121576.1, dated Mar. 16, 2017, 3 Pages.

Notice on the Third Office Action Issued in China Patent Application No. 201080035523.X, dated Feb. 13, 2017, 14 pages.

Notice of the Fourth Office Action Issued in China Patent Application No. 201080035523.X, dated Sep. 4, 2017, 8 pages.

Notice of the Fifth Office Action Issued in China Patent Application No. 201080035523.X, dated Jan. 3, 2018, 7 pages.

Office Action Issued in United Kingdom Patent Application No. 1121576.1, dated Jan. 13, 2017, 4 Pages.

"Non Final Office Action Issued in U.S. Appl. No. 15/074,938", dated Feb. 20, 2018, 19 Pages.

"Office Action Issued in Chinese Patent Application No. 201080035523.X", dated Jul. 4, 2018, 7 Pages.

Duric, et al. "Dynamic-Vector Execution on a General Purpose EDGE Chip Multiprocessor", In Proceedings of 2014 International Conference on Embedded Computer Systems: Architectures, Modeling, and Simulation, Jul. 14, 2014, pp. 18-25.

Duric, et al. "EVX: Vector Execution on Low Power EDGE Cores", In Proceedings of Conference on Design, Automation and Test in Europe Conference and Exhibition, Mar. 24, 2014, 4 Pages.

Duric, et al. "ReCompac: Reconfigurable Compute Accelerator", In Proceedings of International Conference on Reconfigurable Computing and FPGAs (Reconfig), Dec. 9, 2013, 4 Pages.

Fallin, et al. "The Heterogeneous Block Architecture", In Proceedings of 32nd IEEE International Conference on Computer Design, Oct. 19, 2014, 8 Pages.

Govindan, Madhu Sarava., "E3: Energy-Efficient EDGE Architectures", In Dissertation Presented to the Faculty of Graduate School of the university of Texas in Partial Fulfillment of the Requirements for the Degree of Doctor of Philosophy, Aug. 2010, 244 Pages.

Govindan, et al., "Scaling Power and Performance via Processor Composability", In Proceedings of IEEE Transactions on Computers, vol. 63, Issue 8, Aug. 2014, 14 Pages.

Govindaraju, et al. "DySER: Unifying Functionality and Parallelism Specialization for Energy-Efficient Computing", In Proceedings of IEEE Micro vol. 32, Issue 5, Jul. 10, 2012, pp. 38-51.

Gray, et al. "Towards an Area-Efficient Implementation of a High ILP EDGE Soft Processor: Comparing Out-of-Order Dataflow Instruction Scheduler Designs", In Proceedings of the 22nd IEEE International Symposium on Field-Programmable Custom Computing Machines, May 11, 2014, 1 Page.

Leibson, et al. "Configurable Processors: A New Era in Chip Design", In Journal of Computer, vol. 38, Issue 7, Jul. 2005, pp. 51-59.

Li, et al. "Code Layout Optimization for Defensiveness and Politeness in Shared Cache", In Proceedings of 43rd International Conference on Parallel Processing, Sep. 9, 2014, 11 Pages.

Maher, Bertrand Allen., "Atomic Block Formation for Explicit Data Graph Execution Architectures", In Dissertation Presented to the Faculty of the Graduate School of the University of Texas at Austin in Partial Fulfillment of the Requirements for the Degree of Doctor of Philosophy, Aug. 2010, 185 Pages.

Park, et al. "Polymorphic Pipeline Array: A Flexible Multicore Accelerator with Virtualized Execution for Mobile Multimedia Applications", In Proceedings of the 42nd Annual IEEE/ACM International Symposium on Microarchitecture, Dec. 12, 2009, pp. 370-380.

"International Search Report and Written Opinion Issued in PCT Application No. PCT/US2016/051412", dated Dec. 15, 2016,10 Pages.

Pengfei, et al. "M5 Based EDGE Architecture Modeling", In Proceedings of IEEE International Conference on Computer Design, Oct. 3, 2010, pp. 289-296.

Putnam, et al. "Dynamic Vectorization in the E2 Dynamic Multicore Architecture", In ACM SIGARCH Computer Architecture News, vol. 38, Issue 4, Sep. 14, 2010, 6 Pages.

Robatmill et al. "Exploiting Criticality to Reduce Bottlenecks in Distributed Uniprocessors", In Proceedings of 17th IEEE International Symposium on High-Performance Computer Architecture, Feb. 2011, 12 Pages.

Voicu, et al. "3D Stacked Wide-Operand Adders: A Case Study", In Proceedings of the 24th International Conference on Application-specific Systems, Architectures and Processors, Jun. 5, 2013, 9 Pages.

Robatmili, et al., "How to Implement Effective Prediction and Forwarding for Fusable Dynamic Multicore Architectures", In Proceedings of the 19th IEEE International Symposium on High-Performance Computer Architecture, Feb. 23, 2013, 12 Pages.

"Final Office Action Issued in U.S. Appl. No. 15/074,938", dated Dec. 3, 2018, 9 Pages.

"Explicit Data Graph Execution", Retrieved From: https://web.archive.org/web/20150905213046/https://en.wikipedia.org/wiki/Explicit_data_graph_execution, Published on: Sep. 5, 2015, 5 Pages.

"Very Long Instruction Word", Retrieved From: http://en.wikipedia.org/wiki/Verylong_instruction_word, Feb. 13, 2013, 7 Pages.

"Non Final Office Action Issued in U.S. Appl. No. 14/942,461", dated Jan. 18, 2019, 9 Pages.

"Fifth Office Action Issued in Chinese Patent Application No. 201080035523.X", dated Jan. 3, 2018, 7 Pages.

Bakhoda, et al., "Microsoft Research-E2", Retrieved from: https://web.archive.org/web/20150425065120/http://research.microsoft.com/en-us/projects/e2/, Published on: Apr. 25, 2015, 2 Pages.

Chang, et al., "Using Predicated Execution to Improve the Performance of a Dynamically Scheduled Machine with Speculative Execution", In Proceedings of the IFIP WG 10.3 working conference on Parallel architectures and compilation techniques., Jun. 1, 1995, 10 Pages.

Chuang, et al., "Predicate Prediction for Efficient Out-of-Order Execution.", In Proceedings of the 17th Annual International Conference on Supercomputing., Jun. 23, 2003, 10 Pages.

Ebcioglu, et al., "An Eight-Issue Tree-VLIW Processor for Dynamic Binary Translation", In Proceedings of the International Conference on Computer Design., Nov. 1998, 9 Pages.

(56) References Cited

OTHER PUBLICATIONS

Huh, et al., "A NUCA Substrate for Flexible CMP Cache Sharing", In Proceedings of 19th International Conference on Supercomputing., Jun. 20, 2005, 10 Pages.
Mahlke, et al., "Effective Compiler Support for Predicated Execution Using the Hyperblock", In Proceedings of the 25th Annual International Symposium on Microarchitecture., Dec. 1992, 10 Pages.
Quinones, et al., "Improving Branch Predication and Predicated Execution in Out-of-Order Processors", In Proceedings of the 13th International Symposium on High Performance Computer Architecture, Feb. 10, 2007, 10 Pages.
Quinones, et al., "Selective Predicate Prediction for Out-of-Order Processors", In Proceedings of the 20th Annual International Conference on Supercomputing, Jun. 28, 2009, 9 Pages.
Ross, et al., "A Hamming Distance Based VLIW/EPIC Code Compression Technique", In Proceedings of the International Conference on Compilers, Architecture, and Synthesis for Embedded Systems, Sep. 22, 2004, 8 Pages.
Sohi, et al., "High-Bandwidth Data Memory Systems for Superscalar Processors", In the Proceedings of the 4th International Conference on Architectural Support for Programming Languages and Operating Systems, Apr. 1991, 10 Pages.
Xie, et al., "A code decompression architecture for VLIW", In Proceedings of 34th ACM/IEEE International Symposium on Microarchitecture., Dec. 1, 2001, 10 Pages.
"Notice of Re-Examination issued in Chinese Patent Application No. 201080035523.X", dated Mar. 22, 2019, 5 Pages.

* cited by examiner

100
NETWORK
109
COMMUNICATIONS ADAPTER
107
108
DISK ADAPTER
115
DISPLAY
DISPLAY ADAPTER
111
APPLICATION
OPERATING SYSTEM
P
R
PROCESSING ARRANGEMENT
ROM
RAM
106
105
104
103
118
120
121
101
102
110
USER INTERFACE ADAPTER
113
114
112
KEYBOARD

P = PROCESSING CORE
R = ROUTER

DATA MULTICASTING WITH ROUTER REPLICATION AND TARGET INSTRUCTION IDENTIFICATION IN A DISTRIBUTED MULTI-CORE PROCESSING ARCHITECTURE

STATEMENT REGARDING GOVERNMENT SPONSORED RESEARCH

The invention was made with U.S. Government support, at least in part, by the Defense Advanced Research Projects Agency, Grant number F33615-03-C-4106. Thus, the U.S. Government may have certain rights to the invention.

BACKGROUND

In a conventional (undistributed) processing architecture, when an instruction executes, it sends its result to a centralized register file and broadcasts it on a broadcast bypass bus so that any instructions waiting on that result may use it immediately.

In a distributed processor architecture, which may consist of multiple processing cores interconnected via an operand network, an instruction's encoding typically includes an identifier that indicates one or more consuming instructions that need the value. A distributed processor architecture is described, for example, in U.S. Patent Application Publication No. 2005/0005084.

When an instruction executes in a distributed processor architecture, it typically sends the resulting value only to those consuming instructions awaiting the value. This type of instruction encoding may be well-matched to a distributed architecture implementation in which the producing and consuming instructions lie on different processing cores, although certain challenges may arise when an instruction result must be sent to many consuming instructions in such an implementation. Similar challenges may arise in standard cache-coherent on-chip multi-core systems.

BRIEF DESCRIPTION OF THE FIGURES

The features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

DETAILED DESCRIPTION

Figure 1:
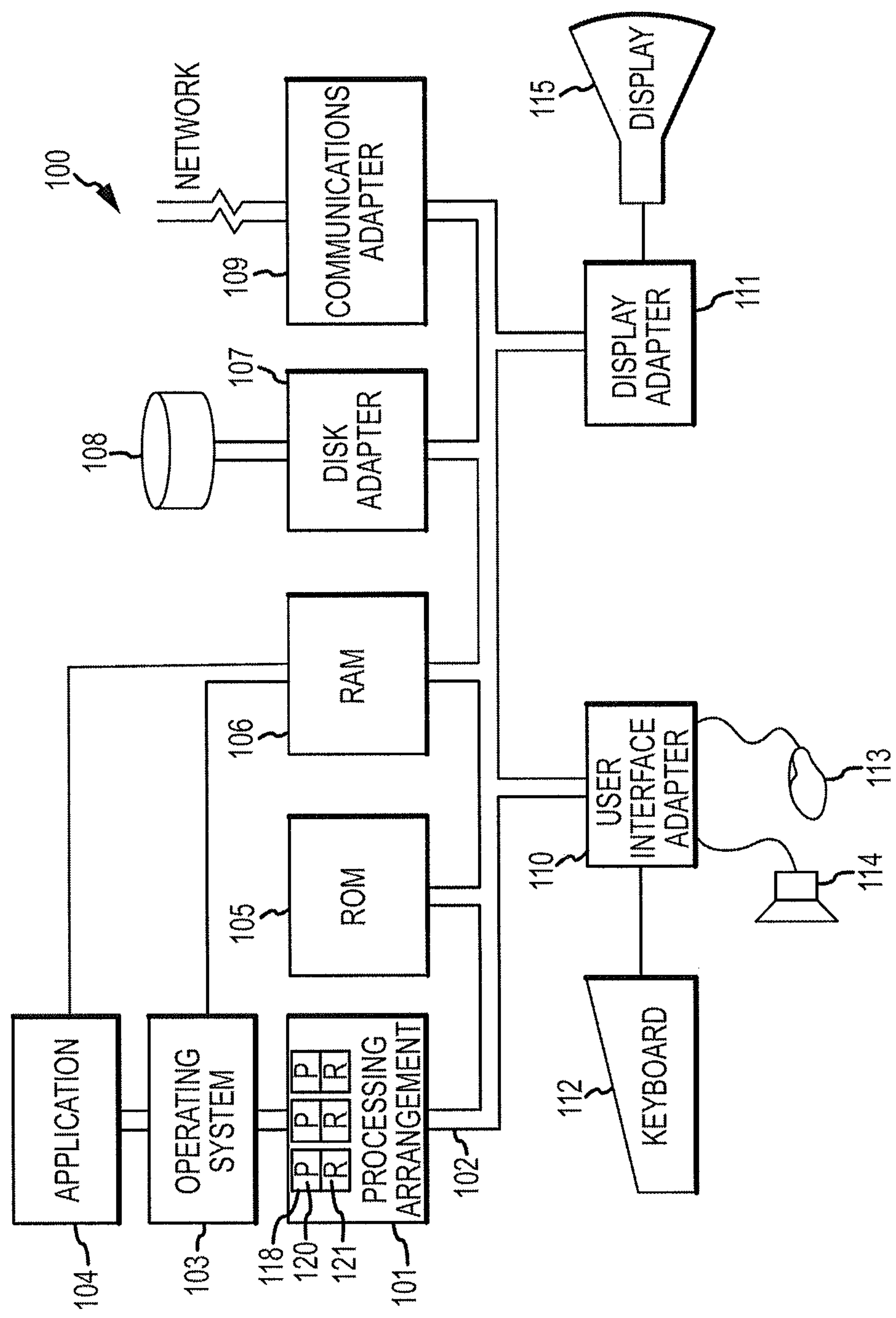
FIG. 1 depicts an example of a hardware configuration of a computer system configured for data multi-casting in a distributed processor architecture.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, may be arranged, substituted, combined, separated, and designed in a wide variety of different configurations, all of which are explicitly and implicitly contemplated and made part of this disclosure.

The various aspects, features, examples, or implementations disclosed and described herein may be used alone or in various combinations. Methods in accordance with the present disclosure may be implemented by software, hardware or a combination of hardware and software.

FIG. 1 depicts an example of a hardware configuration of a computer system configured for data multi-casting in a distributed processor architecture, such as a distributed uni-processor architecture, arranged in accordance with at least some implementations of the present disclosure. Computer system 100 includes a processing arrangement 101, a system bus 102, an operating system 103, an application 104, a read-only memory 105, a random access memory 106, a disk adapter 107, a disk unit 108, a communications adapter 109, an interface adapter 110, a display adapter 111, a keyboard 112, a mouse 113, a speaker 114, a display monitor 115, a processing tile 118, a processing core 120, and a router 121. Although not limited to any particular hardware system configuration, as illustrated in FIG. 1, processing arrangement 101 may be coupled to various other components by system bus 102. As used herein, processing tile 118 may also be referred to as tile 118, and processing core 120 may also be referred to as core 120. Processing arrangement 101 may be implemented as one or more integrated circuit chips and/or integrated circuit dies. Processing arrangement 101 may be a multi-core processing chip and may include a number of processing tiles 118, each having an associated processing core 120 and corresponding router 121. The multiple processing tiles 118 may be interconnected and interoperable by a network on the processing arrangement 101 such as an on-chip network. An operating system 103 may run on processing arrangement 101 to provide control and coordinate the functions of the various components shown in FIG. 1. An application 104 that is arranged in accordance with the principles of the present disclosure may run in conjunction with operating system 103 and may provide calls to operating system 103 where the calls implement the various functions or services to be performed by application 104.

Referring to FIG. 1, read-only memory ("ROM") 105 may be coupled to system bus 102 and include a basic input/output system ("BIOS") that controls certain basic functions of computer device 100. Random access memory ("RAM") 106 and disk adapter 107 may also be coupled to system bus 102. It should be noted that software components including operating system 103 and application 104 may be loaded into RAM 106, which may be the computer system's main memory for execution. Disk adapter 107 may be an integrated drive electronics ("IDE") adapter (e.g., Parallel Advanced Technology Attachment or "PATA") that communicates with a disk unit 108, e.g., disk drive, or any other appropriate adapter such as a Serial Advanced Technology Attachment ("SATA") adapter, a universal serial bus ("USB") adapter, a Small Computer System Interface ("SCSI"), to name a few.

Computer system 100 may further include a communications adapter 109 coupled to bus 102. Communications adapter 109 may interconnect bus 102 with an outside network (not shown) thereby allowing computer system 100 to communicate with other similar devices. I/O devices may also be coupled to computer system 100 via a user interface adapter 110 and a display adapter 111. Keyboard 112, mouse 113 and speaker 114 may all be interconnected to bus 102 through user interface adapter 110. Data may be inputted to computer system 100 through any of these devices. A display monitor 115 may be coupled to system bus 102 by display adapter 111. In this manner, a user is capable of interacting with the computer system 100 through keyboard 112 or mouse 113 and receiving output from computer system 100 via display 115 or speaker 114.

Figure 2:
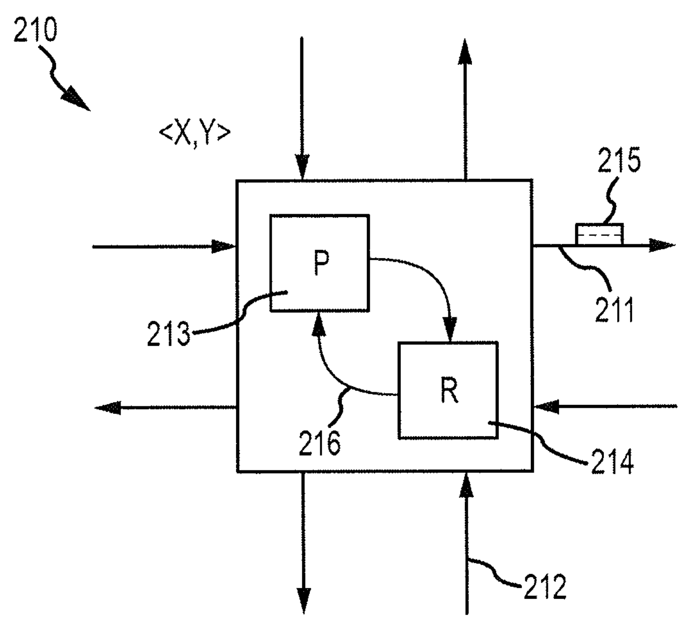
FIG. 2 depicts an example of a processing tile.

FIG. 2 depicts an example of a processing tile arranged in accordance with at least some implementation of the present disclosure. FIG. 2 includes processing tile 210, links 211, 212, a processing core 213, a router 214, a message 215 and links 216. As depicted, processing tile 210 may be coupled to other processing tiles via links 211, 212 on which a message 215 may travel. Processing tile 210 may further include a processing core 213 and a router 214 that may be coupled to one another by links 216. The processing core 213 and router 214 may be configured to perform examples of multicast routing methods and procedures in accordance with the present disclosure. Processing tile 210 may be configured to work together with other processing tiles to execute either a single-threaded or multi-threaded program. In some examples, such as illustrated in FIG. 3, each processing tile may hold instructions that may communicate with up to 128 instructions via multicast.

Figure 3:
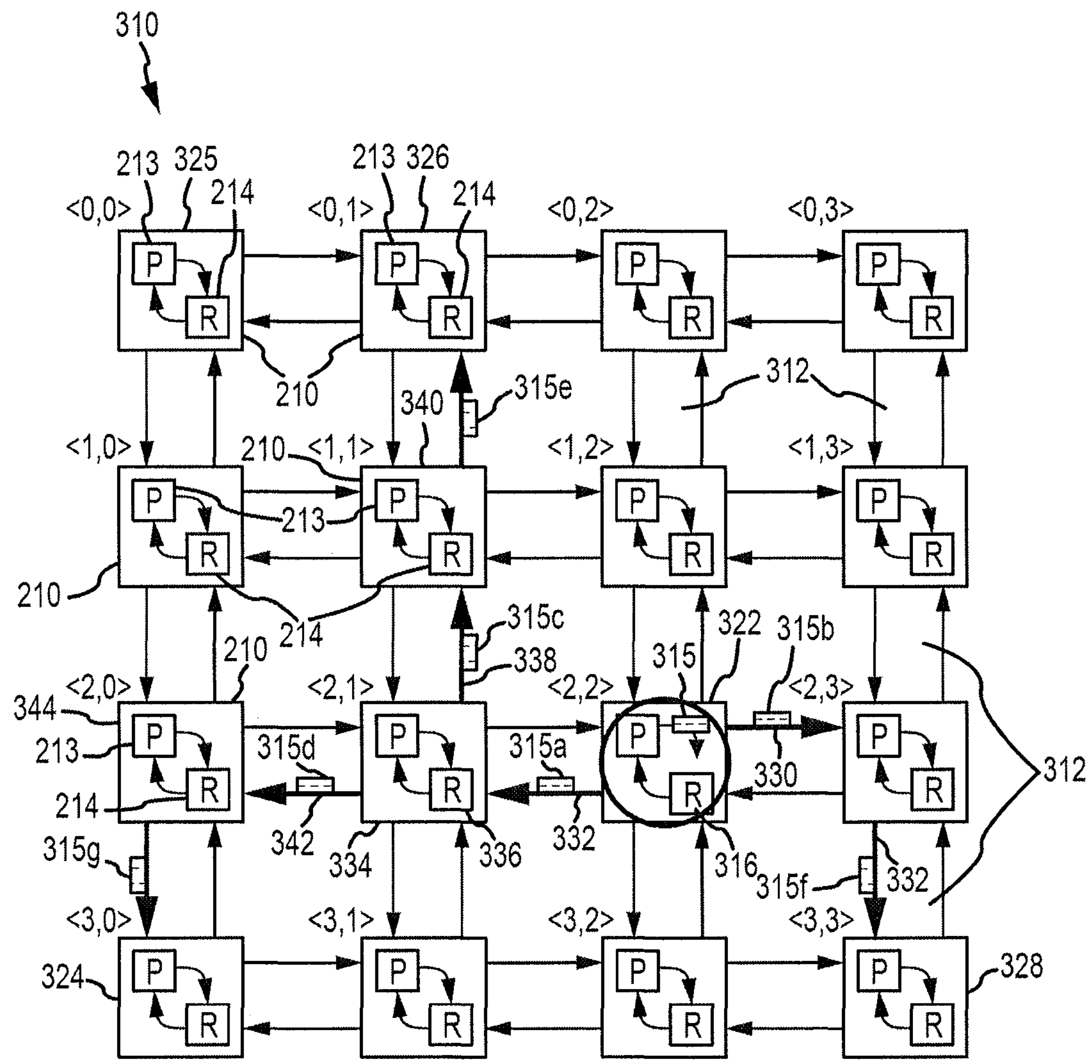
FIG. 3 depicts an example of a 4×4 array of processing tiles coupled via a mesh network.

FIG. 3 depicts an example of a 4×4 array of processing tiles coupled via a mesh network, arranged in accordance with at least some implementation of the present disclosure. FIG. 3 includes a 4×4 array 310, a mesh network 312, processing cores 213, routers 214, a message 315,315*a*, 315*b*,315*c*,315*d*,315*e*,315*f*,315*g*, a router 316, processing tiles 210, a processing tile <0,0> 325, a processing tile <2,2> 322, a processing tile <3,0> 324, a processing tile <0,1> 326, a processing tile <3,3> 328, links 330,332,338,342, a processing tile <2,1> 334, a router 336, a processing tile <1,1> 340, and a processing tile <2,0> 344. The individual processing tiles 240210 may be referenced by position (row, column) within the array 310. For example, processing tile <0,1> 326 may be located in the first row, second column of array 310. Associated with each processing tile 210 are a processing core 213 and a router 214, which may correspond to the processing tiles 210, processing cores 213 and routers 214 may be the same as in the example depicted in of FIG. 2. The processing tiles 210 may be configured to work together to execute either a single-threaded or multi-threaded program, and, in some examples such as illustrated in FIG. 3, each processing tile may hold instructions that may communicate with a number of instructions (e.g., up to 128 instructions) via multicast.

Each instruction identifier may be mapped to a particular coordinate in the array 310 of processing tiles 210. The 16 processing tiles 210 may be mapped with two (2) bits for the x-coordinate and two (2) bits for the y-coordinate. Since there may be 128 possible target instructions total in a block of this example, each processing tile 210 may receive eight (8) instructions. Thus, in some examples, three (3) bits may be used to specify one of eight possible slots (e.g., locations) within a processing core 213 of a processing tile 210 for the instruction.

As illustrated in the example shown in FIG. 3, an instruction may be executed by tile <2,2> 322 and the tile <2,2> 322 may send its executed instruction results to tiles <3,0> 324, <0,1> 326, and <3,3> 328. These targets residing at tiles <3,0> 324, <0,1> 326, and <3,3> 328 may be encoded in the instructions using the example multicast formats depicted in the examples depicted in FIGS. 4 and 5, for example. Router 316 at tile <2,2> 322 may be arranged to interpret the subset and bitmask bits of the message 315 to determine that the value is needed by tiles 210 in columns both eastward (e.g., to the right) and westward (e.g., to the left) of tile <2,2> 322. The instruction on tile <2,2> 322 may inject two copies of the message 315*a*, 315*b* into the network 312 with example target encoding in accordance with the present disclosure. As illustrated in FIG. 3, message 315*a* may be directed west while message 315*b* may be directed east.

There are many different possible mappings of instructions to processing tiles 210 that may be implemented in this example to accomplish consistency among the instruction coordinates and routing. One example of mapping may interleave the instruction identifiers evenly across all 16 processing tiles 210. For example, identifiers "0", "16", "32", "48", etc. may be mapped to the processing tile <0,0> 325 in the upper left corner of array 310, identifiers "1", "17", "33", "49", etc. may be mapped to processing tile <0,1> 326, and so on. With this example mapping, a subset, such as subset 0 from the example depicted in FIG. 4, may specify one instruction mapped to each of the 16 tiles. The same is the case for each of the other subsets, such as subsets 418 of FIG. 4. The mapping of instructions to tiles may depend on which bits from the instruction identifiers are used to select the processing core to which an instruction is mapped. Variations may be useful and the instructions may be mapped to the processing cores unevenly (e.g., some blocks may have all instructions mapped to one processing core, other blocks may have instructions distributed to all processing cores, and other blocks may have instructions mapped to more than one processing core but less than all of the processing cores).

Router 316 may be arranged to replicate the message 315 and send copies of the message 315 both westward (as shown by message 315*a*) and eastward (as shown by message 315*b*) along links 332 and 330 in row 2, respectively. The eastbound message 315*b* needs no further replication and may be routed directly to tile <3,3> 328, as illustrated by message 315*f*. When the westbound message 315*a* arrives at the router 336 in tile <2,1> 334, router 336 may recognize that message replication is necessary. Accordingly, router 336 may send one copy of the message 315*c* northward (e.g., up) along link 338 toward tile <1,1>340 and the other copy of the message 315*d* westward along link 342 toward tile <2,0> 344. Each of these copies of the message 315*c* and 315*d* may then be routed directly to their respective targets (tile <0,1> 326, tile <3,0> 324) without needing further replication, such as shown by messages 315*e* and 315*g*. The routing paths may form a minimum spanning tree in which no link is used to deliver more than one copy of the message. For instance, in some examples, a copy of a message 315 may traverse a particular link only once.

A multicast may be implemented according to the example shown in FIG. 3 with the routers 316 being arranged to interpret the multiple targets from encoding in accordance with some examples of the present disclosure. The coordinates for the processing tiles 210 may be derived, for example, from a 16-bit bitmask. The routers 214 may include combinational logic that may decode the bitmask and may determine one or more of the following operations:

1) If a bit corresponding to a processing core 213 residing at the same processing tile 210 as the router 214 is set, then the router 214 may provide a copy of the message 315 to the processing core 213 residing at the same processing tile 210. Alternatively, the processing core 213 may forward itself operands contained in the message 315.

2) If any of the bits indicate that there are more targets to the north of the router 214, then the router 214 may make a copy of the message 315 and may send the copy north of its location on the array 310. The router 214 may also zero out the bitmask bits for targets that are not located north of the router 214.

3) The router 214 may be configured to repeat operation "2" for possible targets located south, east and west of the router 214.

The above described operations (1-3) may be performed in parallel by parallel hardware. In addition, the combinational logic for operations 1-3 may be tailored for each router 214 depending on the coordinates of the router 214 within the array 310. The example shown in FIG. 3 uses X-Y DOR (dimension-order routing). However, it will be apparent that various other routing algorithms that may be used.

Figure 4:
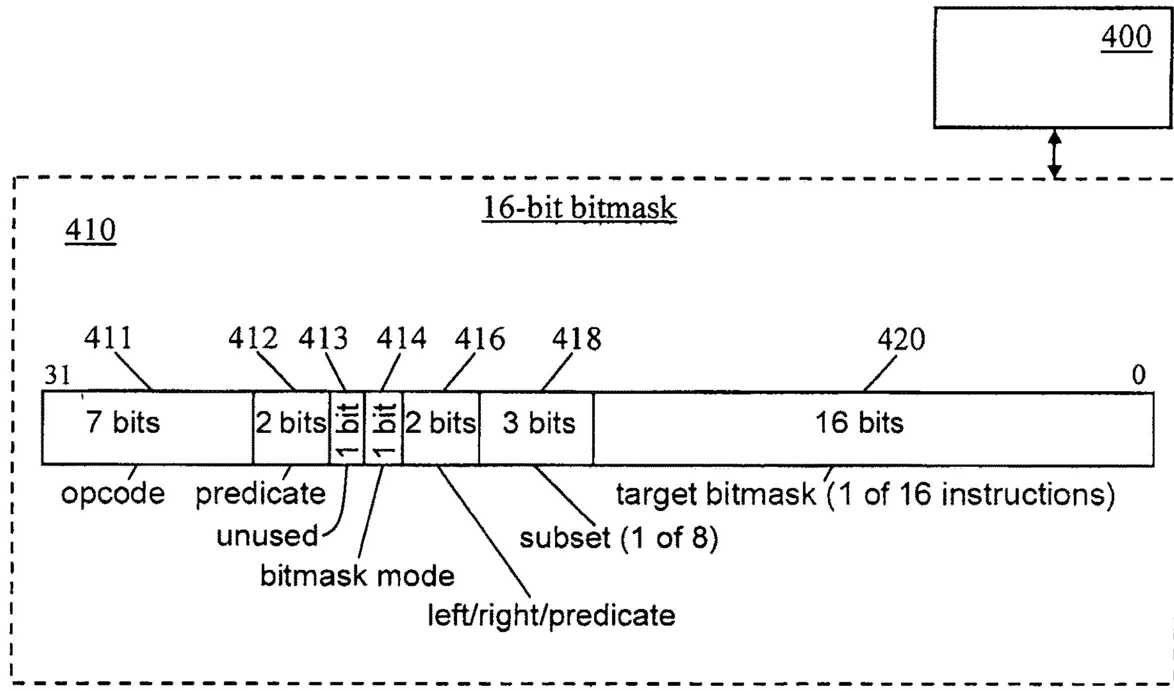
FIG. 4 depicts an example of a bitmap for an instruction.

FIG. 4 depicts an example of a bitmap for an instruction in accordance with at least some implementations of the present disclosure. FIG. 4 includes a compile-time and/or runtime instruction scheduler 400, an instruction 410, an opcode field 411, a predicate field 412, an unused bit 413, a bitmask mode bit 414, a 2-bit left/right/predicate operand field 416, a 3-bit subset field 418, and a 16-bit bitmask 420. The compile-time and/or runtime instruction scheduler 400 may be utilized, for example, for specifying, compiling and/or scheduling instruction 410, which may include a value that is to be read by a target and specifics regarding what the target is do with the value, for example. The 2-bit predicate field 412 may specify several possibilities, in this example four possibilities, based on the predicate condition residing at a target: e.g., (1) the instruction is executed by the target, (2) the instruction is executed when true, (3) the instruction is executed when false, or (4) the instruction is not executed by the target. If a target is unpredicated, the instruction may execute regardless of what is specified in the 2-bit predicate field 412. In other examples, more or fewer bit predicate fields can be used.

According to some examples, such as the example depicted in FIG. 4, the instruction 410 may use some bits that are traditionally unused to help specify up to 16 different targets, which where a number of targets may vary depending on the bit allocation, for example. This may be accomplished, in part, by grouping targets with commonalities. For example, a bitmask mode bit 414 may be used to specify the type of instruction encoding. A determination of the type of instruction encoding may be made by the compile-time and/or runtime instruction scheduler 400. In this case, if set to 0, the instruction may use other encoding techniques known in the art. For example, if identical messages may be sent separately to each of the many targets in a point-to-point message scheme (e.g., using the default mode of typical on-chip networks), the same links may need to be reused a multiple number of times to send the same data. But if bit 414 is set to 1, then, using the encoding depicted in FIG. 4, for example, 2 bits 416 may be used to specify whether the value will be sent to the left operand, right operand, or predicate operand for all of the targets that share this same specification. Another possibility is for the sixteen bits 420 to specify eight two-bit pairs, which each specify a different type of operand, resulting in fewer operands to multicast but with flexibility as to the targets.

Using mapping in accordance with some examples of the present disclosure, common bits, such as common bits 416, may be used to specify the left/right/predicate operand and the slot corresponding to a subset, such as subset 418 depicted in FIG. 4, once the operand has reached the target processing tile, such as processing tile 326, for example. Some examples may allow for a varying number of targets to be specified by a producing instruction, including, e.g., more than two targets, where a number of targets may vary depending on the bit allocation, for example. In addition, the network 312 itself may automatically perform in-network message replication between a producing instruction processing tile (e.g., processing core 316) and target consuming instruction processing tiles (e.g., processing tiles 324,326, 328). Such examples of in-network message replication may provide for the operand message (e.g., message 315) needing to traverse a link within the network once (e.g., a producing instruction processing tile may inject one message into a network (e.g., network 312), which the network may automatically fan out and route the message to the target tiles, automatically replicating the message as necessary).

Further, by employing 3 bits, the instruction may select one of eight possible 16-instruction subsets 418 of the 128 possible target instructions. The sixteen instructions targeted for the selected subset 418 may be identified by the 16-bit bitmask 420. The target instructions thus may share the same subset 418 and left/right/predicate operand field 416. The compile-time and/or runtime instruction scheduler 400 may pack the target instructions into the subsets 418 so that they may be specified in a single multicast instruction, and may optimize a program by assigning instructions that need the same operand to the same subset 418. For example, encoding for the instruction shown in FIG. 4 may have the eight possible subsets 418 include the following instruction identifiers:

subset 0: [0-15];
subset 1: [16-31];
subset 2: [32-47];
subset 3: [48-63];
subset 4: [64-79];
subset 5: [80-95];
subset 6: [96-111]; and
subset 7: [112-127].

In addition, 16 bits 420 may specify a target bit-mask indicating which of the 16 target instructions in the subset 418 will receive the operand. One bit 413 may be unused or reserved for some other use. Other various example encodings are also possible. One such example encoding may conserve one bit by using a 15-bit bit mask.

Figure 5:
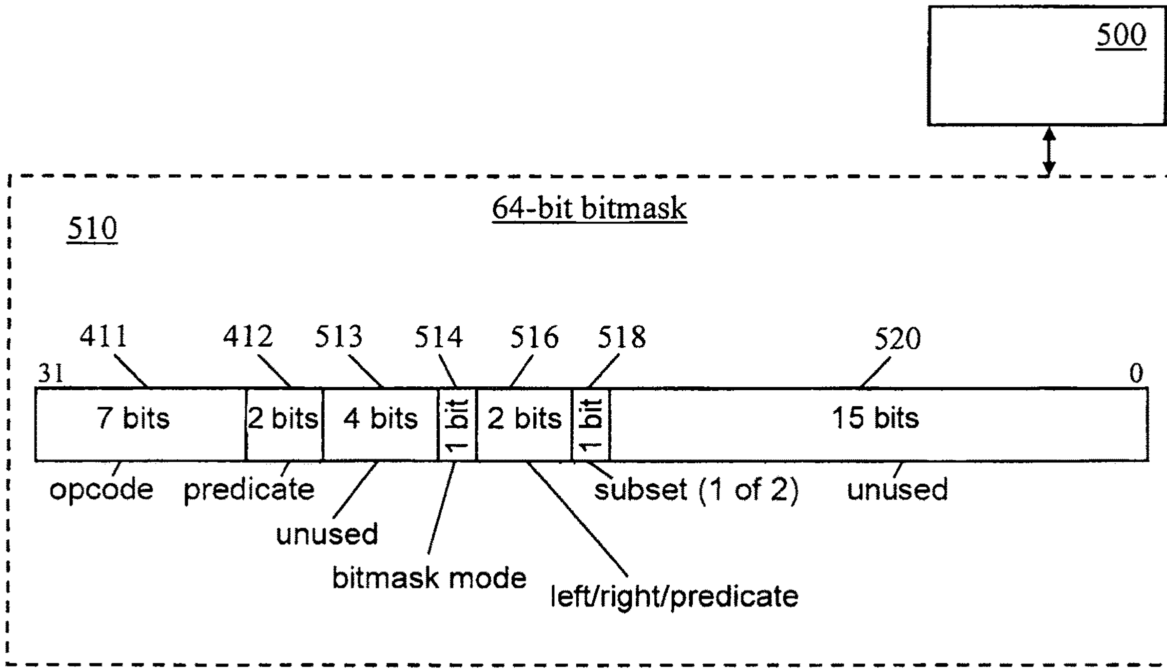
FIG. 5 depicts another example of a bitmap for an instruction in which the bitmask is contained within a register or reservation station.

FIG. 5 depicts another example of a bitmap for an instruction in which the bitmask is contained within a register or reservation station, in accordance with at least some implementations of the present disclosure. FIG. 5 includes a compile-time and/or runtime instruction scheduler 500, an instruction 510, an opcode field 411, a predicate field 412, four bits 513; a bitmask mode bit 514; a 2-bit left/right/ predicate operand field 516; a one-bit subset field 518; and 15 bits 520. As illustrated, the instruction 510 may have the same opcode field 411 and predicate field 412 depicted in the example illustrated in FIG. 4, but encoding a different set of common bits in instruction 510. Similar to the example shown in FIG. 4, one bitmask mode bit 514 may be used to specify the type of instruction encoding. In this case, if set to 0, the instruction may use other encoding techniques known in the art that provide for a limited number of targets. But if bit 514 is set to 1, then the 2-bit left/right/predicate operand field 516 may be used to specify whether the value will be sent to the left operand, right operand, or predicate operand for all of the targets that share this same specification. The one-bit subset field 518 may specify that 1 bit may be used in common for all of the targets of the multicast, encoding one of two possible 64-bit subsets of the 128 possible target instructions in this example. The target instructions thus may share the same subset field 518 and left/right/predicate operand field 516. For example, encoding for the instruction 510 shown in FIG. 5 may have the two possible subsets include the following instruction identifiers: subset 0: [0-63]; and subset 1: [64-127].

As a 64-bit bitmask may be created by one or more other instructions and used, explicitly or implicitly, by multicast instruction 510 to specify one or more of the 64 possible target instructions within the designated subset, the remainder of the bits (e.g., 513, 520) in the instruction 510 may be unused (or reserved for other use). Other various implementations are possible, including using a 32-bit bitmask with 2 bits to specify one of 4 possible 32-instruction subsets, for some examples. With minor changes in the instruction encodings 410, 510, the example implementations illustrated in FIGS. 4 and 5 may both be used in concert. For example, by changing the number of bits in the bitmask and the number of bits in the subset and using various combinations of bits allocated thereto, a varying number of targets may be achieved.

Figure 6:
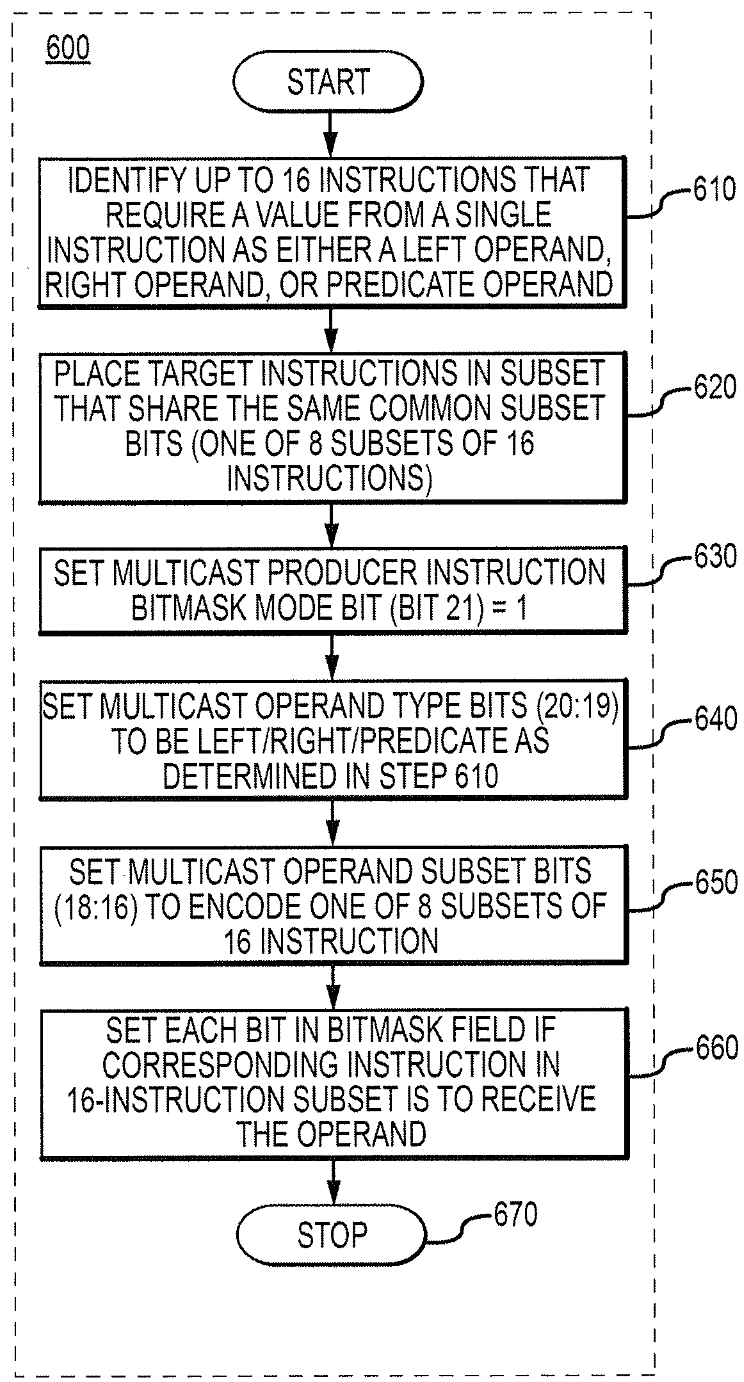
FIG. 6 depicts a flow diagram illustrating an example method specifying the encoding of the example instruction depicted in FIG. 4.

FIG. 6 depicts a flow diagram illustrating an example method specifying the encoding of the example instruction depicted in FIG. 4. In accordance with at least some implementations of the present disclosure. For purposes of some examples, a target bitmask and a bit allocation capable of identifying up to 16 instructions are illustrated, although alternative target bitmasks and/or bit allocations are foreseen that can identify greater or fewer than 16 instructions. FIG. 6 illustrates a process 600 that may include one or more of functional operations or actions as depicted by blocks 610, 620, 630, 640, 650, 660, and/or 670.

Process 600 may include one or more of block 610 (identify up to 16 instructions that require a value from a single instruction as either a left operand, right operand, or predicate operand), block 620 (place some or all of the target instructions in the subset that share the same common subset bits), block 630 (set the multicast producer instruction bitmask mode bit), block 640 (set the multicast operand type bits to be left operand, right operand or predicate operand), block 650 (set the multicast operand subset bits to encode one of 8 subsets of 16 instructions), block 660 (set each bit in the bitmask field if the corresponding instruction in the 16-instruction subset is to receive the operand), and/or block 670 (stop). The bit allocation of the bitmap can alternatively be modified to handle more or fewer than the 8 subsets of the example of FIG. 4. Process 600 illustrated in FIG. 6 may be performed, for example, by a compiler. While process 600 may be implemented in a compiler in this example, the illustrated example method may also be performed by various other processing arrangements.

Referring to FIG. 6, in block 610, process 600 may identify up to 16 instructions, for example, where a number of targets may vary depending on the bit allocation. The instructions may require a value from a single instruction as either a left operand, right operand, or predicate operand. Next, in block 620, in accordance with the example method, process 600 may place target instructions in the subset that share the same common subset bits (e.g., one of 8 subsets of 16 instructions). In block 630, process 600 may set the multicast producer instruction bitmask mode bit (bit 21)=1. Next, in block 640, process 600 may set the multicast operand type bits (bits 20:19) to be left operand, right operand or predicate operand, as identified in block 610. Next, in block 650, process 600 may set the multicast operand subset bits (18:16) to encode one of 8 subsets of 16 instructions. In block 660, process 600 may set each bit in the bitmask field if the corresponding instruction in the 16-instruction subset is to receive the operand, and the process is then complete (block 670).

Figure 7:
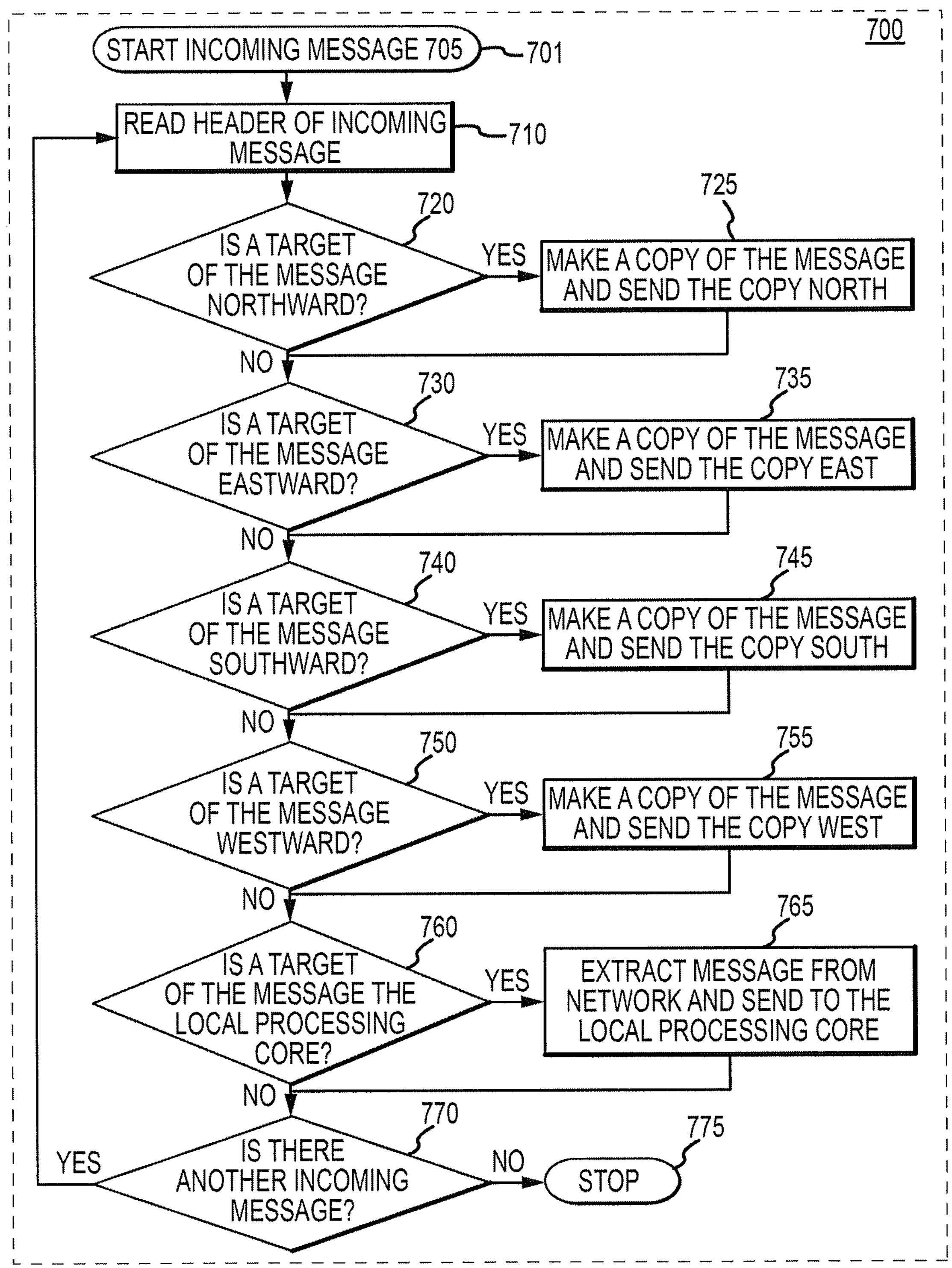
FIG. 7 depicts a flow diagram illustrating an example method for routing as performed by a router shown in the example depicted in FIG. 3, all arranged in accordance with at least some implementations of the present disclosure.

FIG. 7 depicts a flow diagram illustrating an example method for routing as performed by a router shown in the example depicted in FIG. 3, arranged in accordance with at least some implementations of the present disclosure. FIG. 7 illustrates a process 700 that may include one or more of functional operations or actions as depicted by blocks 701, 710, 720, 725, 730, 735, 740, 745, 750, 755, 760, 765, 770, and/or 775.

Process 700 may include one or more of block 701 (start with an incoming message), an incoming message 705, block 710 (read the header of the incoming message), block 720 (inquire whether the location of a target of the message is northward), block 725 (make a copy of the message and send the copy north), block 730 (inquire whether the location of a target of the message is located eastward), block 735 (make a copy of the message and send the copy east), block 740 (inquire whether the location of a target of message is located southward), block 745 (make a copy of the message and send the copy south), block 750 (inquire whether the location of a target of message is westward), block 755 (make a copy of the message and send the copy west); block 760 (inquire whether the location of a target of message is the local processing core), block 765 (extract a copy of the message from the network and provide it to the local processing core), block 770 (inquire if there is another incoming message), and block 775 (stop).

The illustrated example starts at block 701 with an incoming message 705, which needs to be routed by process 700. In some examples, process 700 may be implemented in a router 214 of the examples depicted in FIGS. 2 and 3, for example.

In block 710, process 700 may read the header of the incoming message to determine the location of the targets of the message 705. This may be accomplished by the combinational logic described above with respect to FIG. 5, for example. In block 720, process 700 may inquire whether the location of a target of message 705 is northward (e.g., upwards) of the location of the process 700 on an array such as array 310, for example. If yes, then in block 725, process 700 may make a copy of the message 705 and may send the copy north from its location. Next, in block 730, process 700 may inquire whether the location of a target of message is located eastward (e.g., to the right) of its location on the array. If yes, then in block 735, process 700 may make a copy of the message and may send the copy east from its location. Next, in block 740, process 700 inquires whether the location of a target of message is located southward (e.g., downwards) of its location on the array. If yes, then in block 745, process 700 may make a copy of the message and may send the copy south from its location. Next, in block 750, process 700 may inquire whether the location of a target of message is westward (e.g., to the left) of its location on the array. If yes, then in block 755, process 700 may make a copy of the message and may send the copy west from its location on the array.

Process 700, in block 760, may inquire whether the location of a target of message is the processing core (e.g., 213) located at the processing tile (e.g., 210) associated with process 700. If yes, then in block 765, process 700 may extract a copy of the message from the network and may provide it to the local processing core (e.g., residing on the same processing tile as process 700). Next, in block 770, process 700 may inquire if there is another incoming message 705 that may need to be routed. If yes, then the method may return to block 710, in which process 700 may read the header of the incoming message 705 to determine the location of the targets of the message 705. If there is not another incoming message, the method may stop at block 775 until there is another incoming message, at which point process 700 may repeat the operations illustrated in FIG. 7 and described herein.

According to some examples, the message 705 may be routed in an east or west direction before being routed in a north or south direction, such as shown in FIG. 3, for example. According to other examples, sending the message in a north or south direction may take priority over sending a message in an east or west direction. In some examples, a dynamic prioritization may be implemented wherein the process determines which direction(s) a message should be sent first so as to minimize the total number of links the message, including replications thereof, may travel to reach the target(s). Some examples may utilize a combination of a dynamic implementation with one of the directional prioritization implementations so that one direction may take priority over another when such would not increase the total number of links the message, including replications thereof, may travel to reach the target(s).

The various examples for data multi-casting in a distributed processor architecture, such as a uni-processor architecture, described herein may be utilized in a Composable Lightweight Processor (CLP), such as the TFlex micro-architecture, for example. The TFlex micro-architecture is a CLP that allows simple tiles to be aggregated together dynamically. TFlex is a fully distributed tiled architecture of 32 tiles, with multiple distributed load-store banks, that supports an issue width of up to 64 and an execution window of up to 4096 instructions with up to 512 loads and stores.

The TFlex microarchitecture uses the Tera-op, Reliable, Intelligently adaptive Processing System (TRIPS) Explicit Data Graph Execution (EDGE) instruction set architecture (ISA), which may encode programs as a sequence of blocks that have atomic execution semantics, meaning that control protocols for instruction fetch, completion, and commit may operate on blocks of up to 128 instructions. The TFlex CLP micro-architecture may allow the dynamic aggregation of any number of tiles—up to 32 for each individual thread—to find the best configuration under different operating goals: e.g., performance, area efficiency, or energy efficiency. The TFlex micro-architecture has no centralized micro-architectural structures (other than structures such as, e.g., a PLL for each clock). Structures across participating tiles may be partitioned based on address. Each block may be assigned an owner tile based on its starting address (PC). Instructions within a block may be partitioned across participating tiles based on instruction IDs, and the load-store queue (LSQ) and data caches may be partitioned based on load/store data addresses, for example.

Provided and described herein, for example, is a method for data multicasting in a distributed processor architecture, which has multiple, interconnected processing tiles. The method can include identifying a plurality of targets that are configured to receive a first message from a source, providing target routing instructions to the first message for each of the targets including selected information commonly shared by the targets, and, when two of the identified targets are located in different directions from one another relative to a router, replicating the first message and routing the replicated messages to each of the identified targets in the different directions via, e.g., different output links of the router. In this example, the replicated messages include the subsequently routed first message from the source and copies thereof. The providing target routing instructions may further comprise the selected information utilizing a subset of bits that is commonly shared by the targets. The selected information commonly shared by the targets may be identified as a left operand, right operand or predicate operand, and may include the selection of one of a plurality of multiple-instruction subsets of the targets, for example. In some examples, the number of multiple-instruction subsets may be eight. The target routing instructions may include a bit being used to specify the type of instruction encoding. In some examples, the providing target routing instructions may further comprise utilizing a bitmask created by another instruction. Routing the replicated message may include reading a header of an incoming message to determine the target routing instructions. In some other examples, the processing routing instructions may further comprise, when the routing instructions include routes from the source to targets in different directions, which routes share a common link, configuring the routing instructions such that the replicated messages may traverse collectively the common link once. The routing of the replicated messages to each of the targets may include extracting the first message and/or the replicated message and sending the extracted message to a local processing core upon the router determining that the target resides at the local processing core.

Also provided and described herein, for example, is an apparatus for data multicasting in a distributed processing architecture including a source configured to identify a plurality of targets that are configured to receive a first message from the source and provide target routing instructions to the first message for the targets including selected information commonly shared by the targets. The apparatus may also include a router configured to read the target routing instructions to determine the location of each of the targets and route the message to each of the targets, including replicating the message when two of the targets are located in different directions from one another relative to the router, and only replicating enough to ensure that each target receives only one message. The information may be encoded utilizing a subset of bits that is commonly shared by the targets. The selected information commonly shared by the targets may be identified as a left operand, right operand or predicate operand, and may include the selection of one of a plurality of multiple-instruction subsets of the targets, for example. The router may be configured to extract the message and send it to a local processing core upon the router determining that the target resides at the local processing core.

Also provided and described herein, for example, is a system for data multicasting in a distributed processing architecture including a distributed processing arrangement having a plurality of processing cores interconnected via an on-chip network and a plurality of routers. A source may be associated with one of the plurality of processing cores, and at least one target may be associated with on one or more of the plurality of processing cores. Each one of the plurality of routers may be associated with a corresponding one of the plurality of processing cores, and may be configured to receive a message from a source, identify target routing instructions of a message wherein the identified target routing instructions include selected information commonly shared by the targets from the received message to determine the location of each of the targets and route the message to the targets, replicating the message when two of the targets are located in different directions from one another relative to the router. For example, a source may be configured to encode the selected information utilizing a subset of bits that is commonly shared by the targets. In some examples, the source may be configured to identify one of a left operand, right operand or predicate operand, and may include the selection of a multiple-instruction subset of the targets, for example. In some examples, a router may be configured to extract the message from the network and send the extracted message to a local processing core (or otherwise provide the message or a copy thereof to the local processing core) upon the router determining that the target instruction resides at the local processing core.

The foregoing detailed description has set forth various examples of the devices and/or processes via the use of block diagrams, flowcharts, and/or examples. Insofar as such block diagrams, flow diagrams, and/or examples contain one or more functions and/or operations, it will be understood by those skilled in the art that each function and/or operation within such block diagrams, flow diagrams, and/or examples may be implemented, individually and/or collectively, by a wide range of hardware, software, firmware, or virtually any combination thereof. For example, several portions of the subject matter described herein may be implemented via Application Specific Integrated Circuits ("ASICs"), Field Programmable Gate Arrays ("FPGAs"), digital signal processors ("DSPs"), or other integrated formats. However, those skilled in the art will recognize that some aspects of the examples disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. For example, if a user determines that speed and accuracy are paramount, the user may opt for a mainly hardware and/or firmware vehicle; if flexibility is paramount, the user may opt for a mainly software implementation; or, yet again alternatively, the user may opt for some combination of hardware, software, and/or firmware.

In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a flexible disk, a hard disk drive, a Compact Disc ("CD"), a Digital Video Disk ("DVD"), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or coupled with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and examples have been disclosed herein, other aspects and embodiments will be apparent to those skilled in the art. The various aspects and examples disclosed herein are for purposes of illustration and are not intended to be limiting, with the true scope and spirit being indicated by the following claims.

What is claimed is:

1. A system to data multi-cast in a distributed processing architecture having a plurality of interconnected processing cores, the system comprising:

a distributed processing arrangement having the plurality of interconnected processing cores interconnected via an on-chip network, wherein one of the plurality of interconnected processing cores is a source core, and wherein each of a plurality of target instructions is allocated to an associated target processing core of the plurality of interconnected processing cores; and a plurality of routers, wherein each of the plurality of routers is associated with a corresponding one of the plurality of interconnected processing cores, wherein a first router of the plurality of routers is configured to:

receive a source message from the source core;

from data encoded in the source message, identify routing instructions corresponding to locations of corresponding target processing cores to execute the plurality of target instructions and to locations of corresponding target instruction slots to execute corresponding target instructions, wherein the routing instructions include a data operand, a multiple-bit field specifying a subset of an instruction block including the plurality of target instructions, and a bitmask field specifying which instructions of the plurality of target instructions will receive the data operand, the routing instructions being commonly shared by the plurality of target instructions;

replicate the source message to produce a replica message responsive to a determination that, relative to the first router, a first target instruction allocated to a first associated target processing core of the plurality of interconnected processing cores is located in a different direction than a second associated target processing core of the plurality of interconnected processing cores to which a second target instruction of the plurality of target instructions is allocated;

route the source message in a first direction to the first associated target processing core; and route the replica message in a second direction to the second associated target processing core.

2. The system of claim 1, wherein the source core is configured to encode the data operand utilizing a subset of bits that is commonly shared by the plurality of target instructions.

3. The system of claim 1, wherein the data operand indicates one of a left operand, a right operand, or a predicate operand.

4. The system of claim 1, wherein the plurality of target instructions are divided into a plurality of multiple-instruction subsets, wherein the multiple-bit field includes identification of a selection of one of the plurality of multiple-instruction subsets.

5. The system of claim 1, wherein the first router of the plurality of routers is further configured to:

extract the source message from the on-chip network to produce an extracted source message; and send the extracted source message to the first associated processing core of the plurality of interconnected processing cores associated with the first router responsive to a determination that a target instruction of the plurality of target instructions associated with the extracted source message allocated to the first associated processing core is located in a different direction than the second associated processing core.

* * * * *